United States Patent [19]

Nespor

[11] Patent Number: 4,785,535
[45] Date of Patent: Nov. 22, 1988

[54] CUTTER FOR HIGH VOLTAGE INSULATION STRIPPING FROM CONDUCTOR

[76] Inventor: Tony Nespor, 2515 Glencoe Rd., Baltimore, Md. 21234

[21] Appl. No.: 153,820

[22] Filed: Feb. 8, 1988

[51] Int. Cl.[4] .................. B21F 13/00; B21F 15/02; B25B 27/10; H01B 17/24
[52] U.S. Cl. .................................... 30/90.1; 81/9.4; 156/49; 174/173
[58] Field of Search ................ 30/90.1, 90.2, 92, 93, 30/94, 95, 101, 102; 156/49; 81/9.4; 174/173

[56] References Cited

U.S. PATENT DOCUMENTS

| | | | |
|---|---|---|---|
| 1,841,251 | 1/1932 | Miller | 30/91.2 |
| 3,025,597 | 3/1962 | Huglin | 30/91.2 |
| 3,082,523 | 3/1963 | Modes et al. | 30/90.1 |
| 3,796,115 | 3/1974 | Dane | 30/91.2 |
| 3,822,470 | 7/1974 | Hildebrand | 30/90.1 |
| 4,179,804 | 12/1979 | Maytham | 30/90.1 |

Primary Examiner—Paul A. Bell
Assistant Examiner—Paul M. Heyrana, Sr.

[57] ABSTRACT

A cutter for use in stripping ends of a circular-section conductors insulated with silicon-rubber type material that heat will deteriorate so that a heat stripping is precluded, provides a vehicle that is manually moved across a table top with a length of the insulated conductor to be stripped rolled along the table top in the rolling embrace of a plurality of rollers of the vehicle, guiding and forcing it down while a blade bears down on the insulation at a position offset from the conductor that is insulated. Different roller-lengths protect against slippage of the insulated conductor. Adjustment for various sizes of insulated wire and cable is provided also in different versions of the invention.

24 Claims, 3 Drawing Sheets

CUTTER FOR HIGH VOLTAGE INSULATION STRIPPING FROM CONDUCTOR

FIELD OF THE INVENTION

This invention relates generally to wire strippers and specifically to a cutter for high voltage insulation of the silicon rubber type to be stripped from a conductor.

BACKGROUND OF THE INVENTION

Silicon rubber type insulation for conductors presents special problems in stripping to expose the ends of conductors, whether wire or cable. Although thermal stripping can be used on silicon rubber insulation thickness of 1/32 inch (0.7 mm) or less it will not strip thicker insulation. Silicon rubber will not melt. When touched by a heated blade it turns to ashes and this thin layer acts as an insulator, stopping progress.

The usual procedure therefore involves cold-cutting on a table with an "Exacto" knife or the like, by rolling the insulated wire across the table surface while baring down on it with the knife held transverse to the wire axis. Bad effects can result:

(1) The knife may cut down into the conductor;
(2) Slippage from uneven rolling tends to cause the insulation to be cut in a helix rather than square across in a radial plane, transverse to the axis of the conductor; and
(3) Time and material are wasted..

SUMMARY OF THE INVENTION

In brief summary given as cursive description only, and not as limitation, the invention includes as principal objects: to provide a system for heat-free wire stripping that produces a radial cut through the silicon rubber insulation in a circular-section silicon rubber insulated conductor, whether wire or cable, and without damage to the wire or cable.

Further objects are to provide a system as described that is fast to use, accurate and easily adjusted.

Other objects are to provide a system as described that is conveniently versatile, economical to manufacture and use, lightweight and durable.

Said another way, there is provided a cutter system for use in stripping ends of circular-section conductors insulated with silicon-rubber type material that heat will crystallize or otherwise degenerate so that heat stripping is precluded. The system provides a translative-motion vehicle that is manually moved by rolling on rollers across a table top with a length of the insulated conductor to be stripped rolled along the table top in the rolling embrace of the rollers of the vehicle. Guiding and forcing the vehicle down and with it a blade that bears down on the insulation at a position offset from the conductor that is insulated, cuts the insulation. Provision of different roller-lengths protects against slippage of the insulated conductor, a greater length roller backing up the insulated conductor at the cutting plane. Adjustment for various sizes of insulated wire and cable is provided also in different versions of the invention.

The above and other objects and advantages of this invention will become more readily apparent on examination of the following description, including the drawings in which like reference numerals refer to like parts.

DETAILED DESCRIPTION

Figure 1:
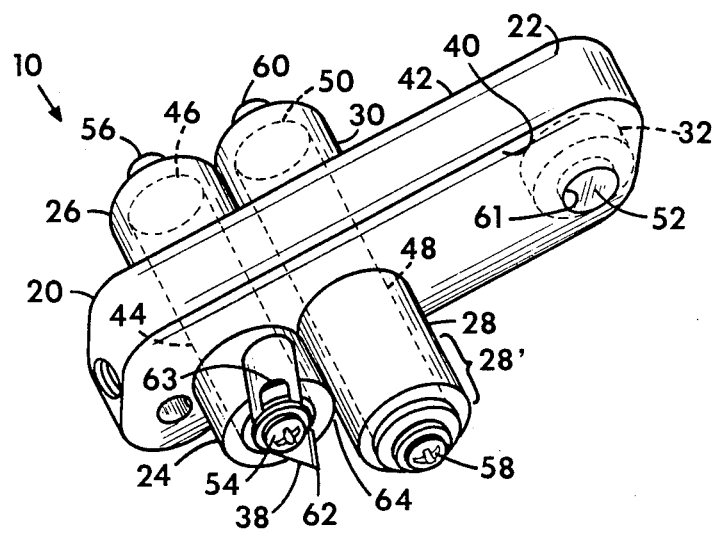
FIG. 1 is a perspective view of a first embodiment of the invention.
Figure 2:
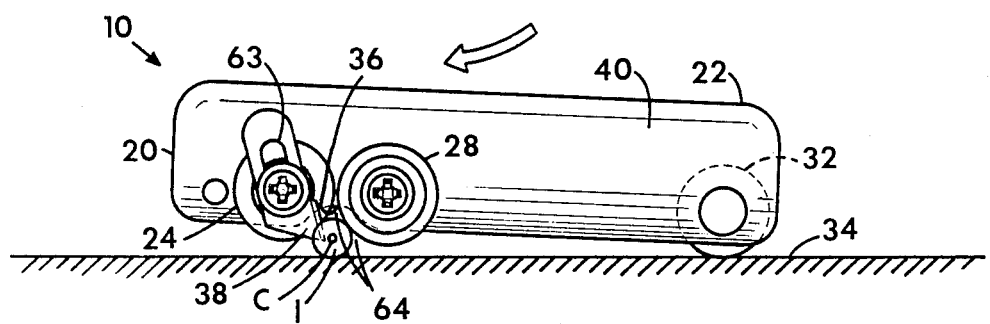
FIG. 2 is an elevational detail of the first embodiment with an insulated conductor in position for beginning a cut in the insulation.

FIGS. 1-4 and 6 show details of embodiment 10, preferred for simplicity. It comprises a vehicle 20 having a rigid elongate body or frame 22 that may have preferably five parallel rollers 24, 26, 28, 30, 32 for supporting it on a plane surface 34. Work clearance is provided by a transverse recess or clearance notch 36 between rollers 24 and 26 and the rollers 28 and 30. A blade 38, the cutting means or means for insertion is adjustably fixed at the end of roller 24, the shorter of the two rollers 24, 28 that extend from the first side 40 of the frame 22. The rollers are made of rigid plastic or metal.

The rollers 24 and 28 are coaxial with respective rollers 26 and 30 extending from the second or far side 42 of the frame 22. Roller 32 is offset longitudinally (in a direction of rolling of the vehicle 20) from the other rollers and serves to stabilize the vehicle 20 longitudinally.

Each roller rotates on a stub axle 44, 46, 48, 50, 52, mounted to the frame 22, the first four held by respective screws 54, 56, 58, 60 and the last by conventional press fit in a hole 61 in the frame.

Screw 54 adjustably mounts, as by a slot 63, the pointed blade 38 so that the pointed end 62 of the blade can be inserted in insulation to be cut.

In use, a length of circular-section silicon rubber high-voltage insulated conductor is passed into the capturing aperture 64 or space between (a) the coaxial rollers 24 and 26, and (b) the coaxial rollers 28 and 30, and (c) planar surface 34. These rollers hold the insulated conductor aligned straight and clear of the frame at the notch in the frame, and when manual pressure is applied down and forward (arrow, FIG. 2) on the vehicle frame 22 the blade 38 inserts into the insulation to be cut and rolling of the vehicle rollers 24, 26, 28, 30 and consequent frictional rolling of the insulation causes the insulation I to be cut progressively all around the conductor C as the blade lowers into it. The frame notch shows at 36.

Importantly, as will be referred to later in reference to FIG. 5 also, the end of the insulated conductor I,C cannot lag behind the other part(lagging shown in FIG. 7, broken lines) when pushed, rolling and being cut because the greater length part 28' (FIG. 1) of the roller 28 extending behind the insulated conductor serves as a backup that forces the end of the insulated conductor to stay in line, result: radial cut, no helix problem.

Importantly also, the conductor C is not touched by the blade 38 regardless of pressure exerted on the blade because the blade is adjusted so that it is ahead of the conductor in the direction of rolling although nearly tangent to the conductor.

Figure 3:
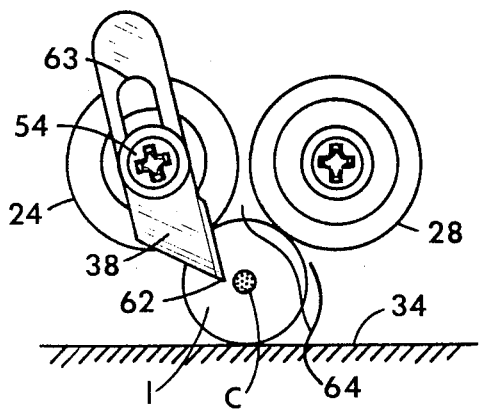
FIG. 3 is an elevational detail of a first step for adjusting the blade for cutting.
Figure 4:
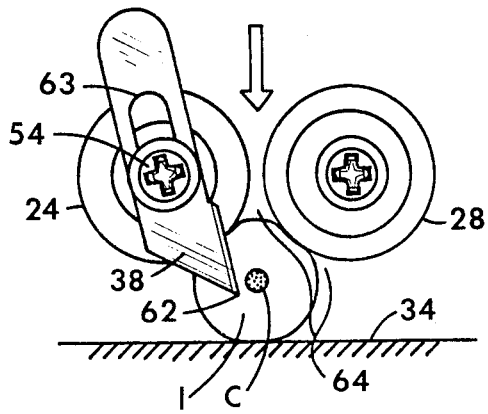
FIG. 4 is a similar view showing a second step.
Figure 6:
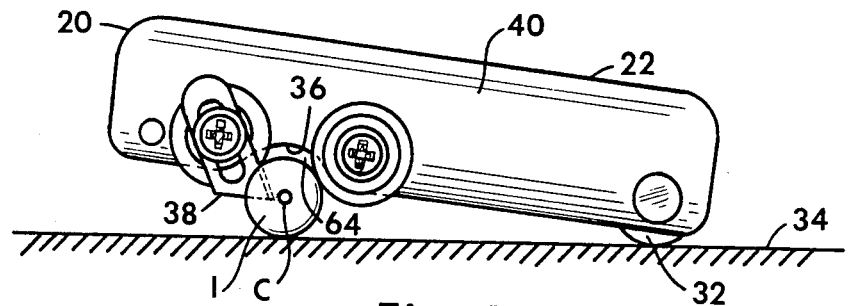
FIG. 6 is a side elevational view of the first embodiment showing use with larger diameter insulated conductor.

As indicated in FIGS. 3 and 4, adjusting the blade 38 relative to the conductor C prior to cutting is easy. An end of the insulated conductor I, C, is held between the rollers as described but just short of the cutting plane of the blade 38, the blade-holding screw (roller 24, screw 54) is loosened, the blade 38 is adjusted so that no part of it lies over the conductor, and so that the blade pointed tip 62 is nearly tangent to the circumference of the conductor, then the screw is retightened. Downward pressure (arrow, FIG. 4) deflects the insulation and indicates blade/conductor clearance.

There is latitude in the size of insulated conductor insulation that the invention will cut, because of the resilience of the insulation.

To adjust for cutting substantially different sizes of insulated conductors the rollers may be substituted by rollers of appropriately different diameter by means of the screws that hold the stub axles and rollers.

Mechanical advantage is adjustable by substitution of rollers to provide a smaller or a greater gap also.

Figure 5:
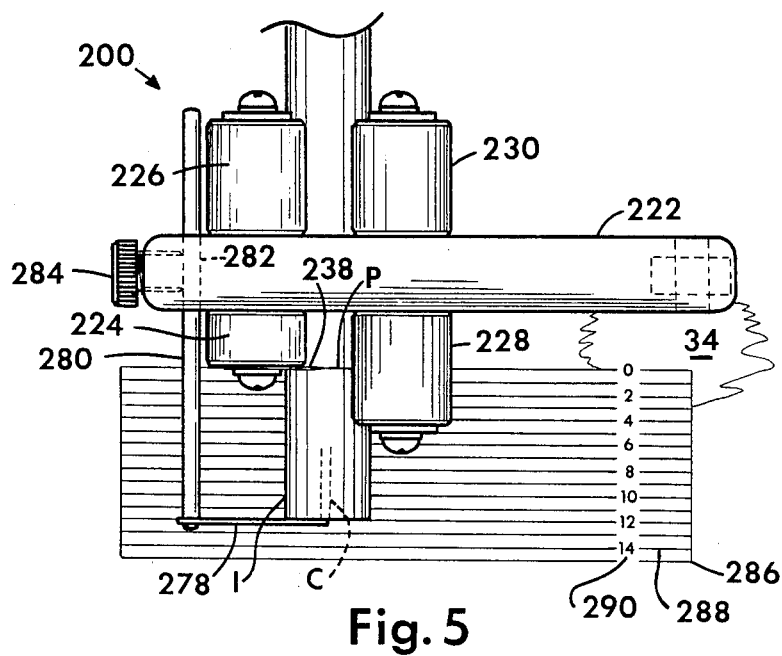
FIG. 5 is a plan view showing the first embodiment with insulation of an insulated conductor being cut in preparation for stripping and separating the cut part along the conductor and showing dimensioning provisions.

FIG. 5 shows in plan view embodiment 200 of the invention. Most details are similar to those of embodiment 100. For example, the proportional length of the rollers 226, 228, 230 preferably may be the longer as indicated (¾ inch; 18 mm) and the roller 224 that defines the cutting plane P by carrying the blade 238 may be shorter (⅜ inch; 9 mm long). These lengths are representative, not limiting; these proportions are shown in conjunction with processing a ⅜ inch (1.5 mm) O.D. length of insulated conductor I,C. As noted, resilience of the insulation permits working substantially larger or smaller diameters, ⅛ inch (3 mm) being about the smallest practicable.

Length of end portion of the insulated conductor to be removed may be set using either a built-in provision or an independent provision, as convenient.

The first or built-in provision includes a plate 278 fixed on a rod 280 that is slidable parallel with the work in a hole 282 in a forward part of the frame 222. A set screw 284 in the end of the frame 222 adjustably clamps the rod 280 to the frame so that the plate 278 stops the end of the work, the insulated conductor, at the location needed for cutting the insulation to desired length in preparation for removing it. Pieces of wire may be rapidly processed in this way without need for looking to adjust. The plate may be of a size to contact all or a selected portion of the end of the insulated conductor.

The second provision for indicating length of insulation to be cut on a length of insulated conductor is a grid 286 that may be a tape with graduations 288 on it that are parallel and numbered as at 290. In use, the cutting plane P defined by the blade 238 may be the edge at the numeral "0" and the length of insulation to be cut set at the desired position on the graduation, then cut as the system is rolled on the table surface, fragment indicated at 34.

Another feature of the invention apparent in FIG. 5, particularly as seen in conjunction with FIG. 4, is that the ends of the rollers can serve as means for depressing the insulation and so preventing axial creep of the insulated conductor relative to the system as a whole, keeping the cutting of the insulation accurately in the cutting plane.

So forceful can the pressure and grip of the rollers be on the relatively soft insulation, that the far end of the piece of insulated conductor can be fixed as by soldering in an assembly and the relative movement between insulation and blade can be caused by twist of the insulation in the grip of the rollers, given a substantially flexible length of insulated conductor of ten to twenty times the diameter in length.

Figure 7:
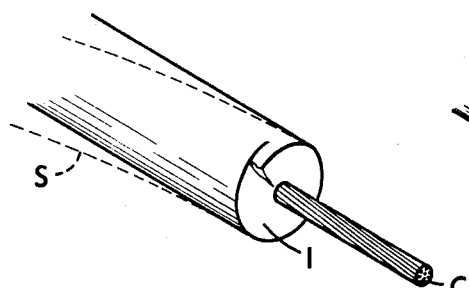
FIG. 7 is a perspective detail showing a conductor imperfectly stripped as a result of using old art apparatus for the cutting.

FIG. 7, as previously mentioned, shows that an insulation of an insulated conductor I,C cut by rolling it on a surface such as a table with a knife blade bearing down on it, will often slew back in a curve as at S, causing the cut in the insulation to be helical, not in a radial plane, requiring discarding or re-cutting.

Figure 8:
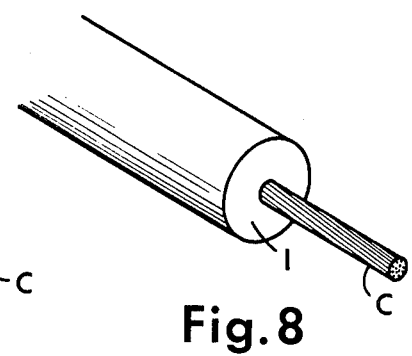
FIG. 8 is a perspective detail showing an end of an insulated conductor perfectly stripped using the present invention.

FIG. 8 shows the perfect cut in a radial plane obtained by using the present invention for cutting insulation I of an insulated conductor C.

Figure 9:
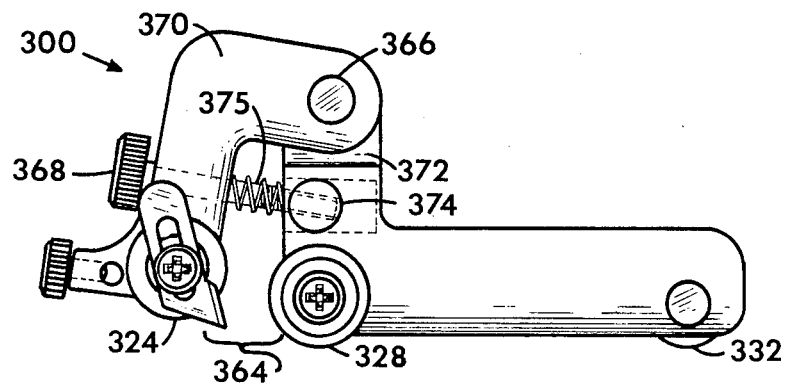
FIG. 9 is a side elevational view of a second embodiment.

FIG. 9 shows a third embodiment 300 with means for adjusting the spacing or capturing aperture 364 between the coaxial rollers 324, 328 (and 326, 330, not shown) to cut most efficiently, in coaction with rolling on a table surface, insulation of different size insulated conductors. This embodiment, 300, is like embodiment 100 generally but has a hinge joint 366 between the pairs of rollers 324, 328 shows. So that the leading pair of rollers can swing up when adjustment screw 368 is actuated, the hinge joint is elevated on arms 370 and 372 by 5cm or so above the rollers 324, 328. Preferably the leading arm 370 is "L"-shaped and extends rearwardly at the top so that the hinge pin 366 lies directly over the axis of roller 328. Element 374 is a pivotal nut for the adjustment screw 368, and 375 is a compression spring biasing apart the arms 370, 372.

A preferred method of initial adjustment to a given size insulated conductor is to open the arms 370, 372, place the insulated conductor in position for cutting, and close the arms using the adjustment screw until the roller 328 rises off the table or other planar surface used, the load being taken by elements 332 and the insulated conductor. As in the other embodiments, the rollers resist hopping over the insulated conductor, being low, and that feature is best realized in this embodiment.

Figure 10:
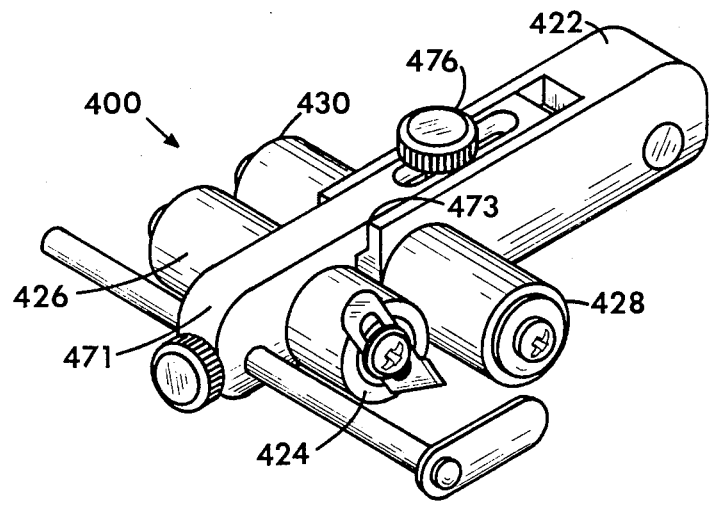
FIG. 10 is a perspective view of a third embodiment.

FIG. 10 shows a fourth embodiment 400 that has a sliding adjustment for varying the spacing between rollers 424, 426, and the rollers 428, 430 to cut different sizes of insulation on conductors. For the sliding, rollers 424 and 426 are mounted on a front slide 471 dovetailed at 473 in body or frame 422 and securable in place by a screw 476 that threads into element 422 and bears on element 471.

Details not given in the other embodiments are similar to those of the first embodiment.

This invention is not construed as limited to the particular forms disclosed herein, since these are to be regarded as illustrative rather than restrictive. It is, therefore, to be understood that the invention may be practiced within the scope of the claims otherwise than as specifically described. For example, fewer or more rollers may be used and the rollers may be grooved circumferentially, but simplest and best embodiments for stability and accuracy of cut are as described.

What is claimed and desired to be protected by United States Letters Patent is:

1. A system for parting insulation on a length of insulated conductor resting against a surface, in preparation for axially stripping the insulation from the insulated conductor, free of need for heating and free of damage to the insulated conductor, comprising: means for constraining the insulated conductor for rolling parallel to itself across the surface, and means connected with the means for constraining and insertable in the insulation in a direction clear of the conductor for cutting the insulation in a radial plane during said rolling across the surface.

2. A system as recited in claim 1, the means for cutting defining a cutting plane, the means for constraining comprising a frame, a first means for rolling, a second means for rolling substantially parallel with the first means for rolling and with a spacing therefrom a distance permitting holding the length of insulated conductor securely against the first and second means for rolling across the surface, the first means for rolling extending from the frame to the cutting plane, the second means for rolling extending from the frame a distance greater than the first means for rolling and thereby restraining said insulated conductor from bending out of said cutting plane at said means for cutting during said cutting.

3. A system as recited in claim 2, the means for cutting comprising a blade, and said direction clear of the conductor being a direction substantially tangential to the conductor.

4. A system as recited in claim 3, and means for stabilizing said system comprising: said first and second means for rolling being on a first side of the frame, and at least a third means for rolling on a second side of the frame.

5. A system as recited in claim 3, and means for stabilizing said system, comprising third and fourth means for rolling on a second side of the frame.

6. A system as recited in claim 5, the third and fourth means for rolling being substantially in alignment respectively with the first and second means for rolling.

7. A system as recited in claim 4, and stabilizing roller parallel with the first and second means for rolling, and offset therefrom in a direction of said rolling.

8. A system as recited in claim 2, and means for adjusting said spacing between the first and second means for rolling for parting insulation on a plurality of sizes of insulated conductors.

9. A system as recited in claim 8, said means for adjusting comprising means for substituting at least first and second means for rolling of different sizes in said system.

10. A system as recited in claim 8, said means for adjusting comprising means for varying the distance between at least said first and second means for rolling.

11. A system as recited in claim 10, the means for varying the distance between at least the first and second means for rolling comprising: a frame, means for mounting all said means for rolling to said frame, a hinge joint in said frame between the first and second means for rolling, and means for adjusting position of said hinge joint.

12. A system as recited in claim 11, said means for adjusting position of said hinge joint including an adjustment screw.

13. A system as recited in claim 3, means for setting the amount of insulation to be parted, comprising said surface having a graduation therewith proportioned for setting the position of the insulated conductor relative to said blade.

14. A system as recited in claim 3, the blade being adjustable held in cutting plane at an end of said first roller.

15. A system as recited in claim 2, said insertion of the means for cutting being by manual pressure on said frame causing said rolling.

16. A system as recited in claim 2, and means for preventing the second means for rolling from hopping over the insulated conductor including means for adjusting distance of the second means for rolling from said surface.

17. A system for heat-free cutting of circular-section insulation on an insulated conductor comprising: a frame, means defining a surface at the frame, first and second rollers on the frame in position for rolling on said surface, said first and second roller shaving parallel axes of rotation and with said surface defining a spacing between the first and second rollers and surface substantially smaller across than said circular section, for rollably retaining said insulated conductor beneath and between the first and second rollers on said surface when they are rolled on said surface, means for preventing bending of said insulated conductor relative to said rollers when rolled, and means for cutting said insulated conductor including a blade fixed in position relative to the frame and extending into said insulation laterally past said conductor.

18. A system as recited in claim 17, the means for preventing bending of said insulated conductor comprising: the first roller having an end at said means for cutting, and the second roller being longer than the first roller and rollingly supporting said insulated conductor beyond the end of the first roller.

19. A system as recited in claim 17, and means for adjusting said spacing for cutting different sizes of insulation on insulated conductors.

20. A system for cutting of an insulated conductor rollable on a surface, free of damage to the conductor and in a radial plane of the insulation, comprising: means for lowering onto and for rollably pushing along the surface the insulated conductor and a blade lowerable therewith, means for cutting said insulation during said rolling by blade lowering motion, means for preventing bending of said insulation during said cutting, and means for avoiding knicking of the conductor by said means for cutting during said cutting, comprising means for adjusting the means for cutting to pass down to a side of the conductor during said lowering.

21. A method of heat-free cutting of insulation on an insulated conductor, comprising the steps: (a) rollably retaining a length of the insulated conductor in a space defined by a plane surface and first and second rollers parallel-spaced in position for rolling the rollers on the plane surface with the length of insulated conductor retained in said space, and (b) rolling all said rollers and length of insulated conductor on said plane surface while pressing a blade, fixed to move a with all said rollers, and connected for movement relative to said insulated conductor, into a portion of said insulation, thereby cutting said insulation.

22. A method as recited in claim 21, and during said pressing of the blade:(c) supporting said insulated conductor by rolling contact by a one of said rollers that extends beyond said blade, during said cutting.

23. A method as recited in claim 21, and protecting said conductor from said cutting by constraining said relative movement to a direction tangent to said conductor.

24. A method of radially cutting resilient insulation that is coaxially disposed around an elongate conductor and constrained for rolling on a planar surface by a plurality of rollers on a vehicle having a blade fixed to the vehicle, said radially cutting being free of damage to the elongate conductor, comprising the steps:
 (a) aligning the blade for insertion in the resilient insulation tangential to the elongate conductor; and
 (b) moving the vehicle in a direction causing simultaneous insertion of the blade into the resilient insulation and rotation of the resilient insulation past the blade; thereby radially cutting said resilient insulation free of damage thereto

* * * * *